United States Patent
Stockbridge et al.

(10) Patent No.: US 10,934,946 B2
(45) Date of Patent: Mar. 2, 2021

(54) BEARING SEAL ASSEMBLY FOR ELECTRONIC THROTTLE CONTROL VALVE

(71) Applicant: Continental Automotive Systems, Inc., Auburn Hills, MI (US)

(72) Inventors: John Norman Stockbridge, Waterford Township, MI (US); Nathan Cowan, Chatham (CA)

(73) Assignee: Continental Automotive Systems, Inc., Auburn Hills, MI (US)

(*) Notice: Subject to any disclaimer, the term of this patent is extended or adjusted under 35 U.S.C. 154(b) by 134 days.

(21) Appl. No.: 15/355,497

(22) Filed: Nov. 18, 2016

(65) Prior Publication Data

US 2017/0204791 A1    Jul. 20, 2017

Related U.S. Application Data

(60) Provisional application No. 62/280,268, filed on Jan. 19, 2016.

(51) Int. Cl.
| | | |
|---|---|---|
| *F16K 1/226* | (2006.01) | |
| *F02D 9/10* | (2006.01) | |
| *F16K 1/22* | (2006.01) | |
| *F16J 15/3236* | (2016.01) | |

(52) U.S. Cl.
CPC ........... *F02D 9/1065* (2013.01); *F02D 9/106* (2013.01); *F16J 15/3236* (2013.01); *F16K 1/224* (2013.01); *F16K 1/2268* (2013.01)

(58) Field of Classification Search
CPC .................................................. F16K 1/2268
USPC .................................................. 251/214, 305
See application file for complete search history.

(56) References Cited

U.S. PATENT DOCUMENTS

| | | | | |
|---|---|---|---|---|
| 4,893,781 A * | 1/1990 | Kalain | .................. | F16K 5/0694 |
| | | | | 251/148 |
| 4,938,452 A * | 7/1990 | Imamura | ................. | F02D 9/106 |
| | | | | 251/305 |
| 5,071,103 A * | 12/1991 | Hannewald | ............. | F02D 11/10 |
| | | | | 251/285 |
| 5,092,296 A * | 3/1992 | Gunter | .................... | F02D 11/10 |
| | | | | 123/337 |
| 5,687,691 A * | 11/1997 | Kaiser | ..................... | F02D 9/106 |
| | | | | 123/337 |
| 6,244,565 B1 * | 6/2001 | McDonnell | ........... | F02D 9/1065 |
| | | | | 251/129.12 |
| 6,912,993 B2 * | 7/2005 | Oyamada | ............. | F02M 37/043 |
| | | | | 123/337 |
| 7,758,018 B2 * | 7/2010 | Pereira Madeira | ..... | F02D 9/103 |
| | | | | 251/305 |

(Continued)

FOREIGN PATENT DOCUMENTS

| | | |
|---|---|---|
| CN | 201210448217 A | 5/2013 |
| EP | 0410871 A1 | 1/1991 |

(Continued)

*Primary Examiner* — Robert K Arundale

(57) ABSTRACT

The present invention is a throttle body assembly which is adaptable for both gasoline and diesel applications, and may also be used for applications to meter fluid, such as for a water cooling valve. The throttle body assembly includes at least one bearing assembly and at least one seal which is used to configure the bearing assembly to withstand a high-pressure environment.

9 Claims, 6 Drawing Sheets

(56) References Cited

U.S. PATENT DOCUMENTS

| | | | |
|---|---|---|---|
| RE42,940 E * | 11/2011 | Kamimura | F02D 9/105 123/399 |
| 9,739,241 B2 * | 8/2017 | Bareis | F02M 26/70 |
| 2004/0011327 A1 * | 1/2004 | Oyamada | F02M 37/043 123/337 |
| 2007/0240677 A1 * | 10/2007 | Sasaki | F16K 1/221 123/337 |
| 2008/0223450 A1 * | 9/2008 | Kino | F02D 9/106 137/331 |
| 2009/0317031 A1 | 12/2009 | Pfundt et al. | |

FOREIGN PATENT DOCUMENTS

| | | |
|---|---|---|
| JP | H04321730 A | 11/1992 |
| JP | H11200899 A | 7/1999 |
| JP | 2004353560 A | 12/2004 |
| JP | 2005337058 A | 12/2005 |
| JP | 2009162085 A | 7/2009 |

\* cited by examiner

BEARING SEAL ASSEMBLY FOR ELECTRONIC THROTTLE CONTROL VALVE

CROSS-REFERENCE TO RELATED APPLICATIONS

This application claims the benefit of U.S. Provisional Application No. 62/280,268 filed Jan. 19, 2016. The disclosure of the above application is incorporated herein by reference.

FIELD OF THE INVENTION

The invention relates generally to a bearing and seal combination used for an electronic throttle body assembly to allow the electronic throttle body assembly to operate at high pressure without damaging the bearings.

BACKGROUND OF THE INVENTION

Throttle body assemblies are generally known, and are a type of valve assembly used for controlling the amount of air flow into the engine during vehicle operation. The throttle body assemblies typically include a valve plate mounted on a shaft which is rotated to control air flow. There is also some type of bushing or bearing which supports the shaft. The throttle body assembly is located in the engine compartment, and is exposed to a harsh environment. The bearings or bushing may be exposed to debris that may be in the air flowing through the valve assembly, acid from the vehicle fuel, and may be exposed to high pressure and high air flow rate. Requirements are such that throttle body assemblies are adaptable for gasoline and diesel applications, as well as have the capability to withstand exposure to a harsh environment. If bearings are used, the bearings are typically needle bearings, because needle bearings and bushings are able to withstand the pressure in the harsh environment.

Ball bearings are considered more desirable for use in these applications since ball bearings offer the advantages of greater durability, assembly, and reduced friction. However, ball bearings typically cannot withstand these harsh environments, primarily because ball bearings are not suitable for operation when exposed to higher air pressure and vacuum, such as environments where the pressure or vacuum is greater than 1.0 bar. The debris and the acid may cause degradation of the bushings or bearings.

Accordingly, there exists a need for a throttle body or valve assembly which is able to incorporate the use of ball bearings which are configured to withstand a harsh environment, such as those where the pressure is 1.0 bar or greater.

SUMMARY OF THE INVENTION

The present invention is a throttle body assembly which is adaptable for both gasoline and diesel applications, and may also be used for applications to meter fluid, such as for a water cooling valve. The throttle body assembly includes at least one bearing assembly and a seal which are used to configure the bearing assembly to withstand a high-pressure environment.

In accordance with an embodiment, the present invention is a valve assembly, including a housing, a central port formed as part of the housing, an aperture formed as part of the housing, and a shaft extending through the aperture such that the shaft extends through the central port. A valve plate is mounted on the shaft such that the valve plate is disposed in the central port. There is also a bore formed as part of the housing, the shaft at least partially extending through the bore. At least one seal is located in the bore such that the seal surrounds the shaft, and at least one bearing assembly is mounted on the shaft and located in the bore such that the bearing is adjacent the seal. As the shaft is rotated to change the position of the valve plate and air flow through the central port, the seal prevents the bearing from being damaged due to exposure to high pressure from the air flow. In one embodiment, the seal prevents the bearing from being damaged due to exposure to pressures greater than or equal to 1.0 bar.

In one embodiment, the seal is located between the bearing assembly and the central port. In another embodiment, the bearing assembly is located between the seal and the central port.

In one embodiment, the seal has an X-cross section which includes a least one inner flange portion and at least on outer flange portion, where the inner flange portion is in contact with the shaft, and the outer flange portion is in contact with the boss.

In another embodiment, the seal includes a base portion, and at least one flange portion integrally formed with the base portion, where the base portion is in contact with the bore, and the flange portion is in contact with the shaft.

In yet another embodiment, the seal includes an outer base portion, and at least one inner lip portion is integrally formed with the outer base portion, such that the outer base portion is in contact with the bore, and the inner lip portion is in contact with the shaft.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
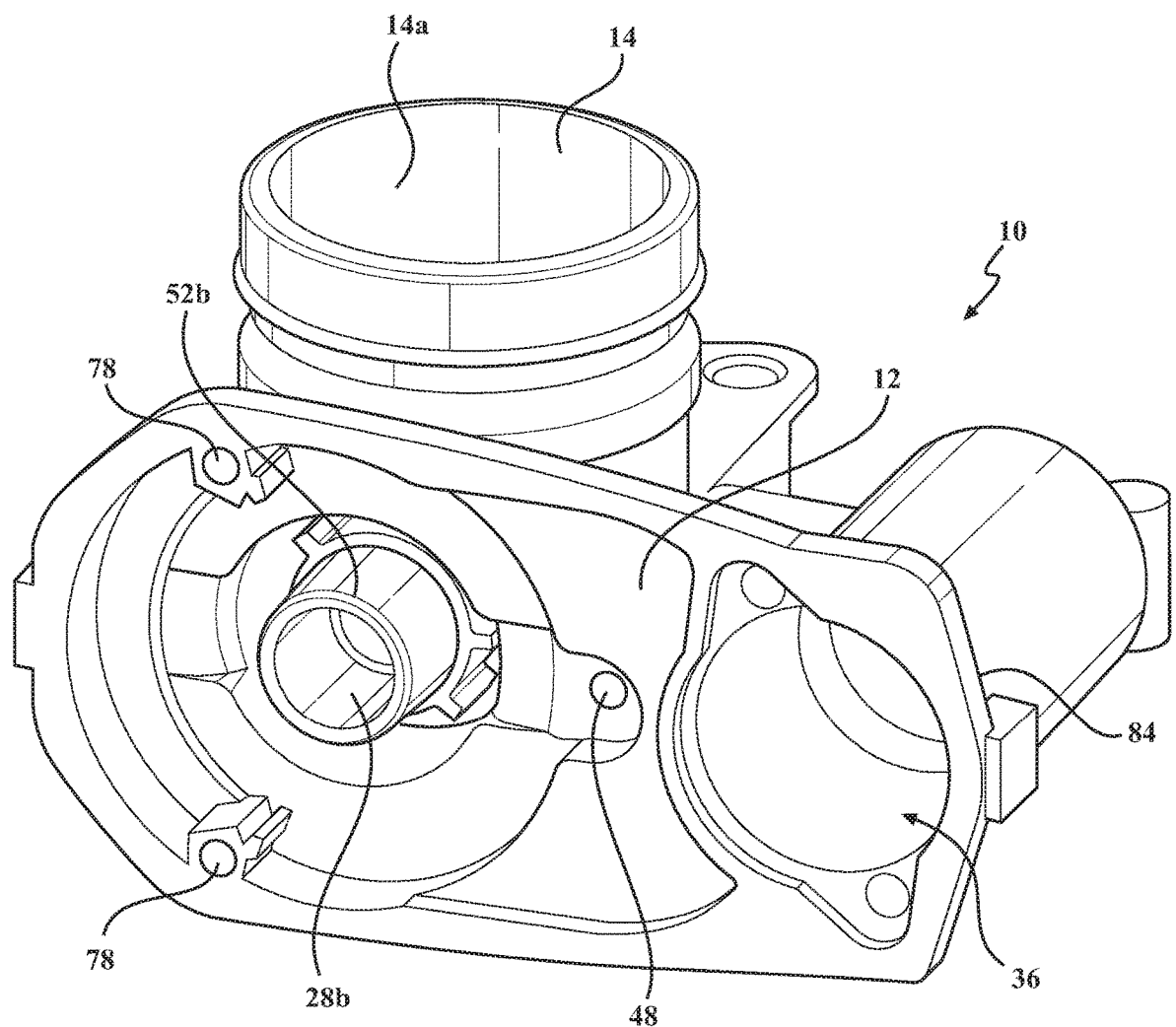
FIG. 1 is a perspective view of a housing of the throttle body assembly, according to embodiments of the present invention.
Figure 2:
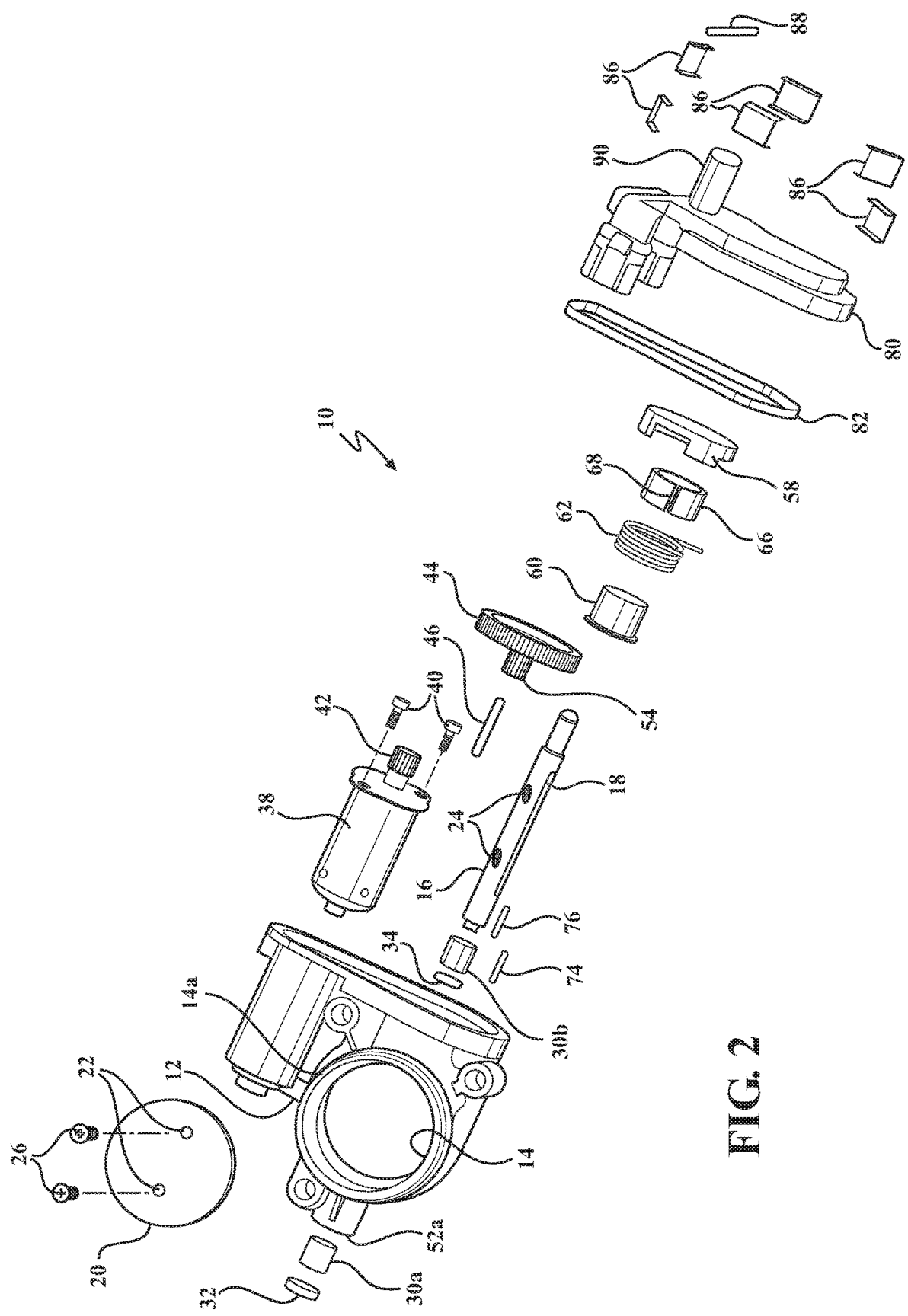
FIG. 2 is an exploded view of a throttle body assembly of an embodiment, according to embodiments of the present invention.

The following description of the preferred embodiment(s) is merely exemplary in nature and is in no way intended to limit the invention, its application, or uses.

A throttle control assembly according to the present invention is shown in the Figures generally at 10. The assembly 10 includes a housing 12, and formed as part of the housing 12 is a central port 14, through which air passes during operation of the assembly 10. Extending through in the central port 14 is a shaft 16, which is rotatable. The shaft 16 includes a slot 18, and disposed in the slot 18 is a valve member, which in this embodiment is a valve plate 20. The valve plate 20 includes two apertures 22, which are in alignment with two threaded apertures 24 formed as part of the shaft 16. Also connecting the plate 20 to the shaft 16 is a fastener, which in this embodiment is a threaded screw 26, which is inserted through the apertures 22 of the plate 20 and the threaded apertures 24 of the shaft 16, securing the valve plate 20 to the shaft 16.

The shaft 16 is partially disposed in an aperture 28a formed as part of a first boss 52a, and the first boss 52a is formed as part of the housing 12. The central port 14 also includes a side wall 14a, which also forms part of the first boss 52a, and the aperture 28a is formed as part of the boss 52a. A first bearing assembly 30a and a second bearing assembly 30b support the shaft 16, and allow for the shaft 16 to rotate relative to the housing 12. The first bearing assembly 30a is located in the boss 52a and held in place in the boss 52a by a plug 32. The second bearing assembly 30b is located in a second boss 52b, and is maintained in the boss 52b by a C-washer 34 located in a groove 50 formed as part of the shaft 16. There is a second aperture 28b formed as part of the side wall 14a such that the second aperture 28b is formed as part of the second boss 52b. The second bearing assembly 30b is located between the C-washer 34 and the end of the shaft 16, and is located inside and supported by the boss 52b formed as part of the housing 12.

The housing 12 also includes a cavity, shown generally at 36, and disposed in the cavity 36 is an actuator, which in this embodiment is an electric motor 38, held in place by two motor screws 40. Attached to the shaft of the motor 38 is a first gear, or pinion gear 42. The pinion gear 42 is in mesh with a second gear, or intermediate gear 44. The intermediate gear 44 is mounted on an intermediate shaft 46, and the intermediate shaft 46 partially extends into an aperture 48 formed as part of the housing 12. Also formed as part of the intermediate gear 44 is a middle gear 54, which is smaller in diameter compared to the intermediate gear 44. The middle gear 54 is in mesh with a sector gear 58.

Mounted on and surrounding the outside of the boss 52 is a lower bushing 60, and mounted on the lower bushing 60 is a biasable member 62, which in this embodiment is a return spring 62, having two coil portions. The return spring surrounds the lower bushing 60, and there is an intermediate bushing 66 disposed between the coil portions of the return spring 62. The intermediate bushing 66 includes a slit portion 68 which allows the intermediate bushing 66 to partially deflect without breaking, such that the coil portions may be made together from a single continuous wire, and the intermediate bushing 66 may be installed between the coil portions.

The sector gear 58 is mounted on one of the coil portions, and one end of the return spring 62 is in contact with a first pin 74 functioning as a first spring stop, and a second end of the return spring 62 in contact with a second pin 76 functioning as a second spring stop. Each of the pins 74,76 are partially disposed in corresponding apertures 78 formed as part of the housing 12.

Connected to the housing 12 is a cover 80, and disposed between the cover 80 and the housing 12 is a seal 82 which surrounds an outer lip 84 formed as part of the housing 12. The cover 80 is connected to the housing 12 using a plurality of clips 86. There is also a secondary cover 88, which is attached to the cover 80. Once the cover 80 is attached to the housing 12, the terminals for the motor 38 can be viewed through an opening in the cover 80. Once it is determined that the terminals of the motor 38 are in contact with the terminals formed as part of the cover 80, the secondary cover 88 is attached to the cover 80.

The cover 80 also includes a connector 90 which is in electrical communication with the motor 38, such that the connector 90 is able to be connected to a source of power. Integrally formed with the cover 80 is a lead frame, which places the connector 90 in electrical communication with a sensor (not shown).

Figure 3:
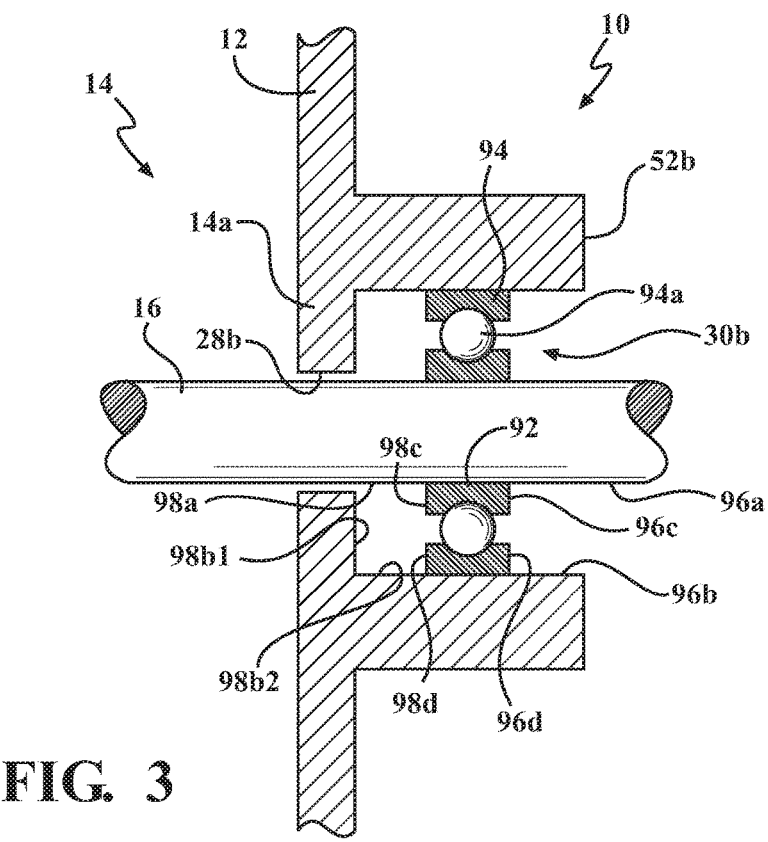
FIG. 3 is a sectional side view of a bearing assembly disposed in a bore of a housing, according to embodiments of the present invention.

An enlarged sectional view of a portion of the housing 12 is shown in FIG. 3, which includes the boss 52b, and the second bearing assembly 30b. Although the second bearing assembly 30b is shown, it is within the scope of the invention that the various aspects of the invention apply to the first bearing assembly 30a as well. The bearing assemblies 30a,30b in this embodiment are ball bearing assemblies. The bearing assembly 30b shown in FIG. 3 includes an inner race 92 in contact with the shaft 16, and an outer race 94 in contact with the boss 52b. Disposed between the inner race 92 and the outer race 94 is a bearing member 94a, which in this embodiment is a ball. There are also several outer seal surfaces 96, one of the outer seal surfaces 96a may be part of the shaft 16, another of the outer seal surfaces 96b is part of the boss 52b, one of the surfaces 96c may be part of the inner race 92, and another of the outer seal surfaces 96d may be part of the outer race 94. There are also several inner seal surfaces 98. More specifically, there is an inner seal surface 98a which is part of the shaft 16, inner seal surfaces 98b1,98b2 which are part of the boss 52b, another inner seal surface 98c which is part of the inner race 92, and an inner seal surface 98d which is part of the outer race 94.

Figure 4:
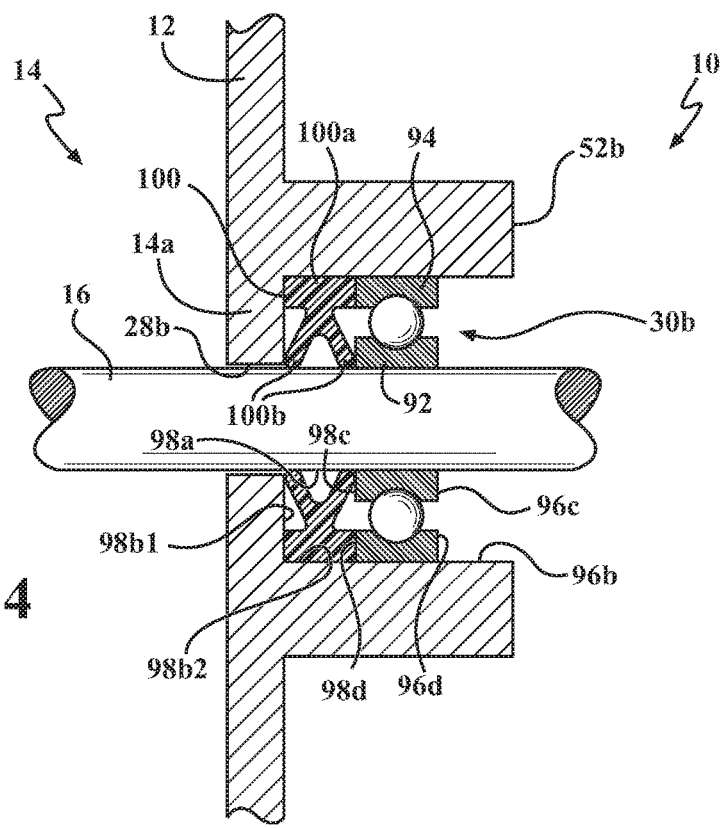
FIG. 4 is a sectional side view of a bearing assembly and an embodiment of a seal disposed in a bore of a housing, according to embodiments of the present invention.

There are different types of seals which may be used to provide a sealing function at or around the bearing assembly 30b. An embodiment of a seal 100 used with the bearing assembly 30b is shown in FIG. 4, where the seal 100 is located between the bearing assembly 30b and the sidewall 14a, such that debris from the central port 14 is substantially prevented from contacting the bearing assembly 30b. The seal 100 includes a base portion 100a and two flange portions 100b. The base portion 100a is in contact with several of the inner seal surfaces 98b1,98b2,98d, one of the flange portions 100b is in contact with the inner seal surface 98a formed as part of the shaft 16 and one of the inner seal surfaces 98b1 formed as part of the boss 52b, and another of the flange portions 100b is in contact with the inner seal surface 98a formed as part of the shaft 16 and one of the inner seal surfaces 98c formed as part of the inner race 92.

Figure 5:
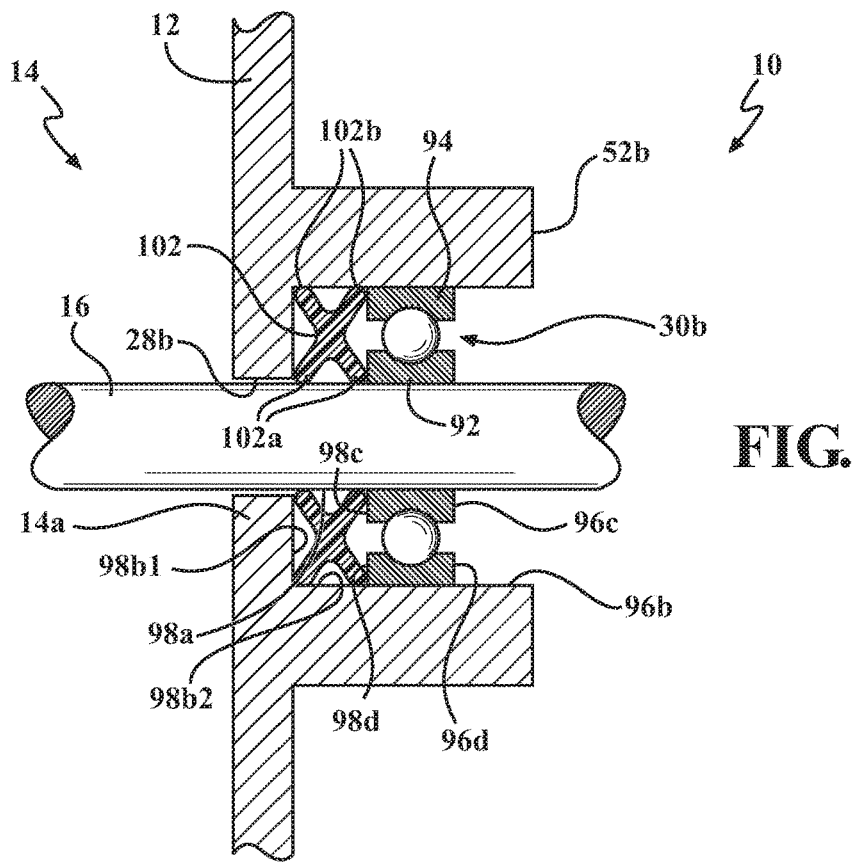
FIG. 5 is a sectional side view of a bearing assembly and another embodiment of a seal disposed in a bore of a housing, according to embodiments of the present invention.

Another embodiment of a seal 102 is shown in FIG. 5, where this seal 102 is also located between the bearing assembly 30b and the side wall 14a. However, in this embodiment, the seal 102 includes an X cross-section, having inner flange portions 102a and outer flange portions 102b. One of the inner flange portions 102a is in contact with the inner seal surface 98a formed as part of the shaft 16 and one of the inner seal surfaces 98c formed as part of the inner race 92, and another of the inner flange portions 102a is in contact with the inner seal surface 98a formed as part of the shaft 16 and one of the inner seal surfaces 98b1 formed as part of the boss 52b. One of the outer flange portions 102b is in contact with the inner seal surfaces 98b1,98b2 of the boss 52b, and another of the outer seal surfaces 102b is in contact with one of the inner seal surfaces 98b2 of the boss 52b and the inner seal surface 98d of the outer race 94.

Figure 6:
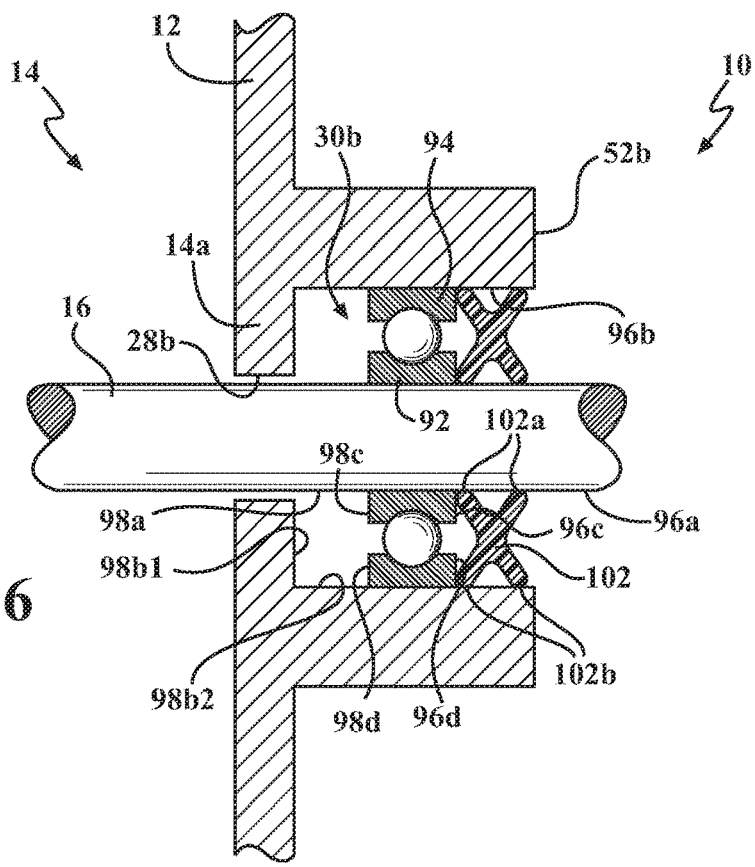
FIG. 6 is a sectional side view of a bearing assembly and yet another embodiment of a seal disposed in a bore of a housing, according to embodiments of the present invention.

The seal 102 may also be placed outside of the bearing assembly 30b, as shown in FIG. 6, such that the bearing assembly 30b is closer to the side wall 14a in relation to the seal 102. In this embodiment, one of the inner flange portions 102a of the seal 102 is in contact with the outer seal surface 96a formed as part of the shaft 16, the other inner flange portion 102a is in contact with the outer seal surface 96a of the shaft 16, and the outer seal surface 96c formed as part of the inner race 92. One of the outer flange portions 102b is in contact with the outer seal surface 96b formed as part of the boss 52b, the other outer flange portion 102b is in contact with the outer seal surface 96b formed as part of the boss 52b, and the outer seal surface 96d formed as part of the outer race 94.

Figure 7:
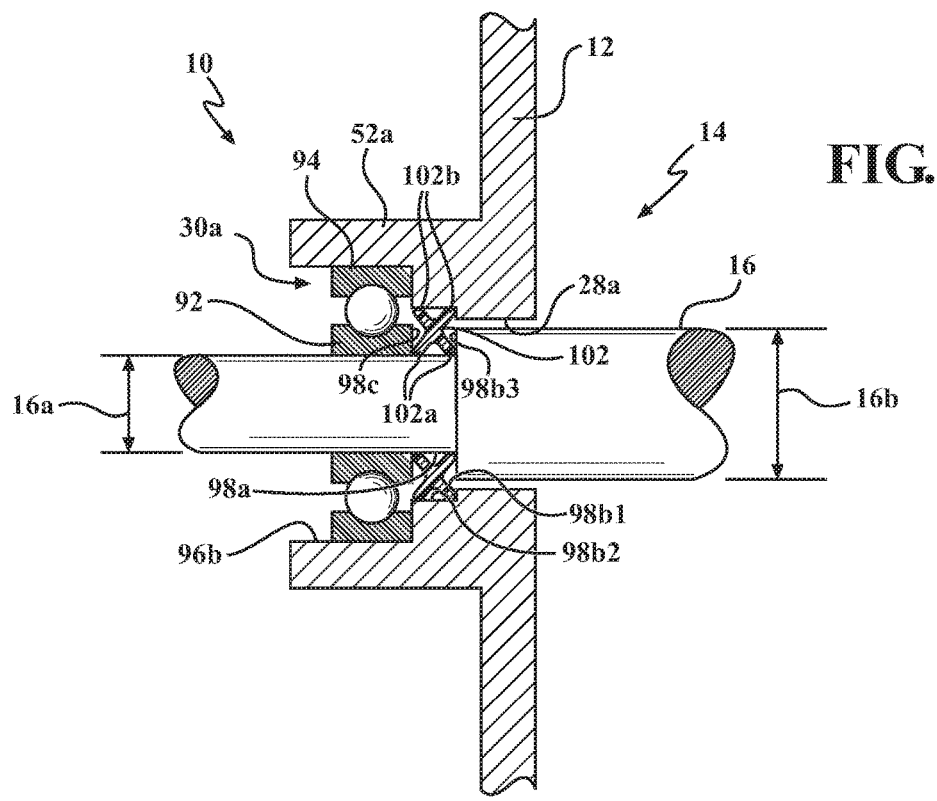
FIG. 7 is a sectional side view of a bearing assembly and still another embodiment of a seal disposed in a bore of a housing, according to embodiments of the present invention.

Another embodiment is shown in FIG. 7, where the shaft 16 has two diameters, a first diameter 16a, which is smaller than a second diameter 16b. Also shown in FIG. 7 is the seal 102 having the X cross-section, where one of the inner flange portions 102a is in contact with the inner seal surface 98c of the inner race 92 and the inner seal surface 98a of the shaft 16, and another of the inner flange portions 102a is in contact with two of the inner seal surfaces 98a,98b3 of the shaft 16. Furthermore, one of the outer flange portions 102b is in contact with the inner seal surface 98b2 of the boss 52a, and the other outer flange portion 102b is in contact with the inner seal surfaces 98b1,98b2 of the boss 52a.

Figure 8:
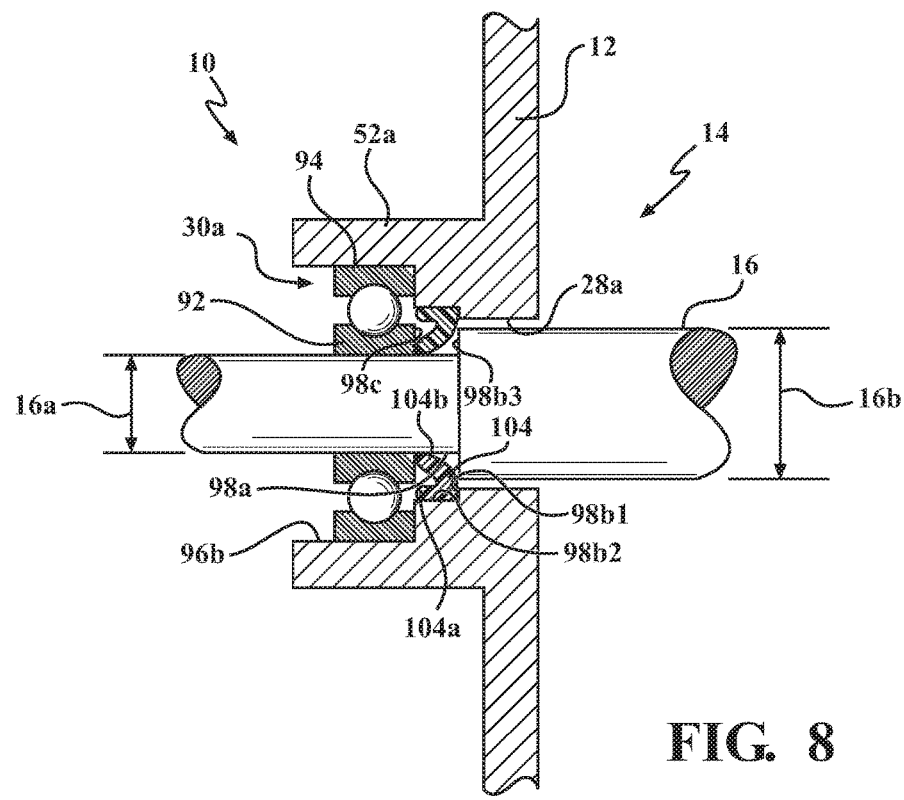
FIG. 8 is a sectional side view of a bearing assembly and still another embodiment of a seal disposed in a bore of a housing, according to embodiments of the present invention.

Yet another embodiment is shown in FIG. 8, with the shaft 16 also having two diameters 16a,16b. In this embodiment, a lip seal 104 is used having an outer base portion 104a and an inner lip portion 104b. In this embodiment, the outer base portion 104a of the lip seal 104 is in contact with the inner seal surfaces 98b1,98b2 of the boss 52. The inner lip portion 104b is in contact with the inner seal surface 98a of the shaft 16, and the inner seal surface 98c of the inner race 92.

Figure 9:
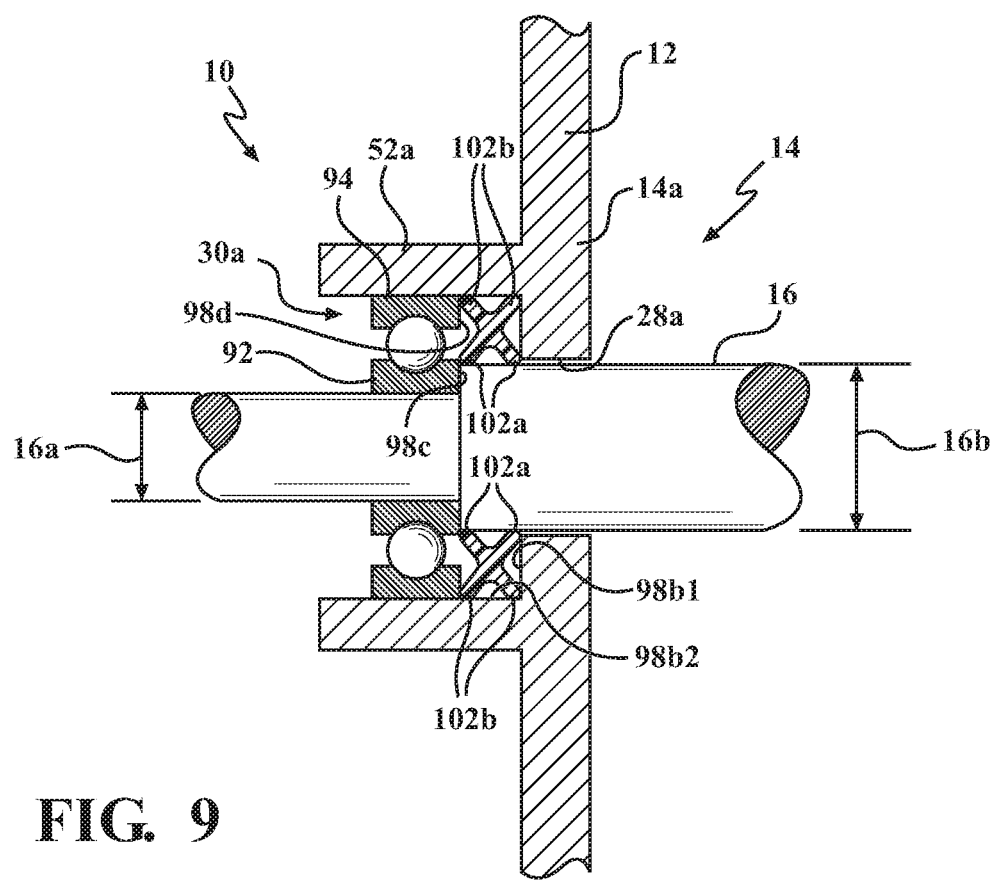
FIG. 9 is a sectional side view of a bearing assembly and yet another embodiment of a seal disposed in a bore of a housing, according to embodiments of the present invention.

Another embodiment of the present invention is shown in FIG. 9, with like numbers referring to like elements. In this embodiment, the shaft 16 again has two diameters 16a,16b. However, in this embodiment, the seal 102 is located on the second diameter 16b, which is the larger of the two diameters 16a,16b. In this embodiment, the housing 12 and the boss 52a are shaped differently to accommodate the change in location of the seal 102. The inner race 92 is adjacent the portion of the shaft 16 having the second diameter 16b, but is still mounted to the portion of the shaft 16 having the first diameter 16a. The seal 102 having the X cross-section is used, but it is within the scope of the invention that seals of other shapes and cross-sections may be used as well. In this embodiment, one of the inner flange portions 102a is in contact with the inner seal surface 98a of the shaft 16, and another of the inner flange portions 102a is in contact with the inner seal surface 98a of the shaft 16 and one of the inner seal surfaces 98b1 of the boss 52a. Also, one of the outer flange portions 102b is in contact with the inner seal surface 98d of the outer race 94 and the inner seal surface 98b2 of the boss 52a, and the other outer flange portion 102b is in contact with the inner seal surfaces 98b1,98b2 of the boss 52a In operation, the spring 62 biases the sector gear 58, and therefore the shaft 16 and valve plate 20 towards a closed position, such that the central port 14 is substantially closed, or blocked completely, depending upon how the assembly 10 is configured. When a current is applied to the motor 38, the pinion gear 42 is rotated, which causes the rotation of the intermediate gear 44, the middle gear 54, and the sector gear 58. To rotate the sector gear 58, the force applied to the sector gear 58 by the return spring 62 is overcome. The amount of rotation of the sector gear 58 is in proportion to the amount of current applied to the motor 38, which must overcome the force applied to the sector gear 58 by the return spring 62.

As the sector gear 58 is rotated, the shaft 16 is rotated as well, rotating the plate 20, and allowing increased levels of air flow through the central port 14. The amount of rotation of the sector gear 58 is detected by the sensor, such that the valve plate 20 may be placed in a desired position. The shaft 16 is supported by the bearing assemblies 30a,30b, and the seals 100,102,104 prevent leaking around the bearing assemblies 30a,30b during the operation of the throttle control assembly 10. The throttle control assembly 10 may be used to control the flow of air, or any type of fluid, making the assembly 10 useful for many different applications, including applications where the assembly is exposed to high pressures.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus comprising:
   a valve assembly, including:
      a housing defining a central port;
      a valve plate disposed in the central port and mounted on a shaft, the shaft further comprising:
         a first diameter portion;
         a second diameter portion, the second diameter portion being larger than the first diameter portion;
      at least one boss formed as part of the housing, the shaft at least partially disposed in the at least one boss;
      at least one bearing assembly disposed in the boss, such that the shaft extends through and is supported by the bearing assembly, and the at least one bearing assembly is mounted on the first diameter portion, the at least one bearing assembly further comprising:
         an outer race in contact with the housing;
         an inner race, the shaft extending through the inner race;
         a bearing member disposed between the inner race and the outer race;
      at least one seal located in the boss adjacent the at least one bearing assembly the at least one seal further comprising:
         a plurality of inner flange portions, one of the plurality of inner flange portions in contact with the inner race and the shaft, and another of the plurality of inner flange portions in contact with the boss and the shaft;

a plurality of outer flange portions, one of the plurality of outer flange portions in contact with the outer race and the at least one boss; and an actuator for controlling the rotation of the valve plate and the shaft;

wherein the at least one seal prevents leaks between the at least one seal and the at least one boss, and the at least one seal prevents leaks between the at least one seal and the shaft when the at least one seal is exposed to high pressure.

2. The apparatus of claim 1, wherein the at least one seal is located between the at least one bearing assembly and the central port.

3. The apparatus of claim 1, wherein the at least one seal is located on the second diameter portion of the shaft.

4. A valve assembly, comprising:

a valve assembly, including:

a housing;

a side wall formed as part of the housing;

a central port formed as part of the housing, the side wall being part of the central port;

at least one aperture formed as part of the side wall;

a shaft extending through the at least one aperture such that the shaft extends through the central port, the shaft further comprising:

a first diameter portion;

a second diameter portion, the second diameter portion being larger than the first diameter portion;

a valve plate mounted on the shaft such that the valve plate is disposed in the central port;

at least one boss formed as part of the housing, the at least one aperture being part of the at least one boss;

at least one seal located in the at least one boss such that the at least one seal surrounds the shaft the at least one seal further comprising:

a plurality of inner flange portions, one of the plurality of flange portions being in contact with the at least one boss and the shaft;

a plurality of outer flange portions;

at least one bearing assembly mounted on the shaft and located in the at least one boss such that the at least one bearing is adjacent the at least one seal, and the at least one bearing assembly is mounted on the first diameter portion, the at least one bearing assembly further comprising:

an outer race in contact with the housing, one of the plurality of outer flange portions in contact with the outer race and the at least one boss;

an inner race, the shaft extending through the inner race, another of the plurality of inner flange portions being in contact with the inner race and the shaft; and a bearing member disposed between the inner race and the outer race;

wherein as the shaft is rotated to change the position of the valve plate and air flow through the central port, the at least one seal prevents leaks between the at least one seal and the at least one boss, and the at least one seal prevents leaks between the at least one seal and the shaft when the at least one seal is exposed to high pressure from the air flow.

5. The valve assembly of claim 4, wherein the at least one seal prevents the at least one bearing from being exposed to pressures greater than or equal to 1.0 bar.

6. The valve assembly of claim 4, wherein at least one seal is located between the at least one bearing assembly and the central port.

7. The valve assembly of claim 4, wherein the at least one seal further comprises an X-cross section.

8. The valve assembly of claim 7, the at least one seal having an X-cross section further comprising
one of the plurality of outer flange portions is adjacent to the at least one aperture.

9. The valve assembly of claim 4, wherein the at least one seal is located on the second diameter portion of the shaft.

* * * * *